United States Patent [19]

Tomka

[11] 4,360,590

[45] Nov. 23, 1982

[54] PHOTOGRAPHIC MATERIAL

[75] Inventor: Ivan Tomka, Bourguillon, Switzerland

[73] Assignee: Ciba-Geigy AG, Basel, Switzerland

[21] Appl. No.: 184,567

[22] Filed: Sep. 5, 1980

[30] Foreign Application Priority Data

Sep. 12, 1979 [CH] Switzerland ........................ 8253/79

[51] Int. Cl.[3] .......................... A23J 1/10; G03C 1/00; G03C 1/02; G03C 1/72

[52] U.S. Cl. .................................... 430/642; 430/569; 430/495; 260/118; 260/112.5 R

[58] Field of Search .............................. 430/569, 642; 260/112.5, 118

[56] References Cited

U.S. PATENT DOCUMENTS 2,868,661 1/1959 Tschentke et al. ................. 430/642

OTHER PUBLICATIONS

Tonka et al., Structure & Formation of the Gelatin Gel Journal of Photographic Science, vol. 23, 1975, pp. 97–103.

Gross et al., Non Gelling Components from Gelatin Gels Extraction & Identification Journal of Photographic Science, vol. 23, pp. 33–42.

*Primary Examiner*—John E. Kittle
*Assistant Examiner*—John L. Goodrow
*Attorney, Agent, or Firm*—Joseph G. Kolodny

[57] ABSTRACT

Novel gelatins which contain microgel, oligomers of α-gelatin, α-gelatin and not more than 25 percent by weight of fragments of α-gelatin (peptides) with a molecular weight of less than $9 \times 10^4$ are used as binders in layers of photographic materials.

Photographic additives are readily compatible with the gelatins. Furthermore, the good viscosity characteristics and short setting times of the gelatins also facilitate the production of photographic materials.

10 Claims, No Drawings

PHOTOGRAPHIC MATERIAL

The present invention relates to photographic material which contains, as a binder, in at least one layer, a gelatin which contains microgel, oligomers of α-gelatin, α-gelatin and fragments of α-gelatin (peptides).

As is known, gelatin is a purified protein which is obtained by partial hydrolysis of the scleroprotein (albuminoid) collagen. Because of the diversity of raw materials used in the production of gelatin, specifically skin material from cattle and calves, pigskins and ossein (demineralised, usually comminuted bones), and the technologically very diverse production processes, the gelatin obtained varies considerably in respect of its chemical and physical properties.

Usually, the raw material is subjected to digestion with alkali, for example using milk of lime or sodium hydroxide solution, (so-called "lying") and is then melted out in a substantially neutral solution. The so-called "acid digestion process" is also known and in this process the alkaline pre-treatment is dispensed with and melting out is carried out in an acid medium. The gelatin solutions obtained in each case are filtered, concentrated and dried. Details of the gelatin production processes have been disclosed, for example, in G. Reich, "Kollagen" ("Collagen"), 1966, page 242 et seq., Verlag Theodor Steinkopff, Dresden and A. G. Ward and A. Courts, "Science and Technology of Gelatin", 1977, Academic Press.

The properties of the gelatin obtained in this way depend to a large extent on the raw material used, on the digestion process chosen and particularly heavily on the reaction conditions during the digestion, the extraction and drying. The methods of gelatin production and the attainment of specific desired properties are to a large extent based on empirical experience. It is true that a considerable degree of reproducibility is achieved in this way. However, it has been found that gelatins which are used to produce photographic products must always be tested in a practical experiment. Otherwise it would not be possible to produce photographic materials with the requisite uniformity.

The main constituent of the raw materials is the so-called tropocollagen; this is a well-defined protein molecule which consists of two identical $\alpha_1$-chains and an $\alpha_2$-chain which differs somewhat from the former the said chains being linked to one another in the region of their N-terminal aminoacid. The aminoacid sequence of the $\alpha_1$-chain is known precisely in the case of calfskin collagen; the polypeptide consists of a linear chain of 1,052 aminoacids. In this connection see P. I. Rose & S. Gross "Photographic Gelatine", (edited by R. J. Cox), page 89, Academic Press, 1976.

Gelatin consists of a mixture of diverse fragments of tropocollagen, which are formed on acid or alkaline degradation. The following four fractions, which are present in various ratios depending on the origin of the gelatin, are differentiated as main constituents:

1. α-gelatin: intact α-polypeptide chains
   molecular weight $9.5\times10^4$
2. oligomers of the α-chain, consisting of 2 to 15 linked α-chains
   molecular weight $10^5$–$10^6$
3. "microgel": polymers of up to 1,000 linked α-chains
   molecular weight $10^7$–$10^8$
4. "peptides": various sized fragments of the α-chain molecular weight 1 to $9\times10^4$.

A typical composition of conventional types of gelatin which are obtained by alkaline pre-treatment of the raw material and subsequent extraction with water at about 45° to 60° C. is shown in Table 1 below.

TABLE 1

| Designation of the component | Molecular weight | Content (% by weight) |
|---|---|---|
| Microgel | $10^7$–$10^8$ | 0–15 |
| Oligomers of α-gelatin | $10^5$–$10^6$ | 10–30 |
| α-Gelatin | $9.5\times10^4$ | 10–40 |
| Fragments of α-gelatin (peptides) | $10^4$–$9\times10^4$ | 30–80 |

In this context see A. Veis, "The Macromolecular Chemistry of Gelatin", Academic Press 1978, and also I. Tomka, Chimia 30, 534 et seq. (1976 No. 12). The separation of gelatin into the various fractions has been described in detail by I. Tomka et al. in J. Phot. Sci., 23, 97 (1975).

In the meantime it has been found that the four main fractions of gelatin determine its physical properties and usefulness in very different ways:

The α-fraction and its oligomers up to a size of about 10–15 α units are the most valuable constituent. By virtue of the special configuration in the aminoacid sequence, these are the fractions which largely determine the gelling characteristics of the gelatin solutions. Because of the upper limit on the molecular weight of these fractions, solutions thereof have a low to medium viscosity, such as is frequently desired for the production of photographic layers.

The fraction which is designated "microgel" and has the highest molecular weight is always present in a small amount, and experience has shown that because of this it does not contribute very much to the lattice structure of the gelatin gel and in particular it is not able to exert a substantial influence on the speed of gelation. However, because its molecular weight is extremely high in some cases, this fraction is to a large extent that which determines the viscosity of the aqueous gelatin solutions. A high proportion of microgel is therefore desirable in those cases in which a high viscosity is preferred for reasons of coating technology; in these cases it is possible to dispense with additives which increase the viscosity; if, in other cases, a low viscosity is desired, gelatin with a low microgel content will be preferred.

In respect of the physical properties, the fraction comprising the peptides, i.e. the fragments of α-gelatin, is the least valuable constituent of the gelatin. It has been found that the peptides do not participate in the build-up of the gel network, but remain substantially in the sol form. They thus weaken the lattice structure and delay gel formation. Gelatins which solidify slowly thus always contain a large proportion of peptides.

In addition, it has been found that gel formation can also be disturbed by a further factor: natural collagen contains only aminoacids in the L-configuration. If digestion is carried out for a relatively long period, a gradual racemisation can take place, as a result of which some of the L-aminoacids are rearranged into the D-form. If relatively large proportions of D-aminoacids are present within the chains, the build-up of a coherent network can be disturbed for steric reasons; the solidification time of the solutions is thus considerably prolonged. The aim must therefore be for gelatins which have as low as possible a content of D-aminoacid radicals.

For numerous applications of gelatin in the foodstuffs, pharmaceuticals and photographic sectors, it is highly desirable to have a gelatin which solidifies rapidly, because this, for example, is technologically particularly easy to handle and gives reproducible products of constant quality. The gelling (setting) times of known gelatins (measured at 16° C. and with 2.5 g of gelatin in 1 dl of water) are much longer than one minute, and for many applications this leads to considerable difficulties.

It is the object of the invention to propose a novel gelatin as a binder for photographic emulsions, which gelatin has a solidification time which is shorter than that of known types of gelatin and in particular is less than one minute.

According to the invention, the object is achieved when the gelatin contains less than 25% by weight of fragments of α-gelatin (peptides).

The present invention therefore relates to a photographic material which contains, on a base, in at least one layer, as a binder, gelatin which contains microgel, oligomers of α-gelatin, α-gelatin and fragments of α-gelatin (peptides), wherein the gelatin contains less than 25 percent by weight of fragments of α-gelatin (peptides) with a molecular weight of not more than $9\times10^4$.

The present invention also relates to a process for the production of the photographic materials according to the invention, the use of the novel gelatins as binders in photographic layers (materials) and the use of the photographic layers (materials) for the production of photographic images.

The peptide content is in particular below 20 percent by weight and preferably also below 10 percent by weight.

Preferred gelatins contain as a rule 2 to 20, and preferably 5 to 15, percent by weight of microgel, 30 to 70 percent by weight of oligomers of α-gelatin (n=2–15), 20 to 60 percent by weight of α-gelatin and less than 25 percent by weight of peptides.

At the same time, the content of aminoacid radicals having the D-configuration in the gel-forming fractions is not more than 5 percent by weight.

The molecular weight of the constituents of the microgel is approximately between $10^7$ and $10^8$, the oligomers of α-gelatin have molecular weights in the range of from about $10^5$ to $10^6$, whilst the molecular weight of the α-gelatin is about $9.5\times10^4$ and the fragments of α-gelatin (peptides) have a molecular weight of about $10^4$ to $9\times10^4$.

The gelatins according to the invention are also distinguished by the fact that they have a high viscosity. The preferred viscosity range is between 25 and 125 mP, preferably between 45 and 105 mP.

The viscosity values given are based on a 6.67% gelatin solution (6.67 g of gelatin in 100 ml of water) at 60° C. For 6.67% solutions of gelatin and at 40° C., the viscosity is about 8 to 20 cP (80 to 200 mP).

It is also possible to achieve particularly short setting times by mixing suitable gelatin fractions, each of which is distinguished by a low peptide content or a high viscosity. In corresponding experiments, setting times of, for example, 2 to 20 seconds at 16° C. have been achieved with 2.5 g of gelatin in 1 dl of water.

A preferred process for the preparation of a gelatin according to the invention is distinguished by the fact that the gelatin from raw material which has been subjected to an alkaline pre-treatment in the conventional manner is melted out (extracted) in a temperature range (extraction temperature) between 70° and 100° C. for a period (extraction time) of 5 to 120 minutes at a pH value (extraction pH) of between 5.5 and 7.0.

It is best to use raw material which has been subjected to an alkaline pre-treatment in the conventional manner (for example with aqueous calcium hydroxide or sodium hydroxide solutions) as the starting material for the preparation of the gelatins according to the invention, although, in principle, it is also possible to work in an acid medium. In order to obtain the desired short setting times it is essential that, in contrast to the extraction under mild conditions for a long period (with a relatively long residence time of the extraction water, or of the gelatin solution which is continuously becoming enriched, at a low temperature), which has been customary hitherto, the reaction is carried out at a high temperature for a short time. This is to be understood as meaning that the gelatin is extracted or melted out in a temperature range (extraction temperature) between about 70° and 100° C. for a period (extraction time) of about 5 to 120 minutes. The pH value (extraction pH) is between about 5.5 and 7.0 and preferably between 6.5 and 7.0. A weakly alkaline extraction pH of up to about 8.5 can also be suitable. A particularly advantageous range for the extraction temperature is between about 70° and 92° C. and a particularly preferred extraction time is between about 20 and 40 minutes.

The aqueous gelatin solutions obtained in this way are cooled to temperatures below 55° C. and preferably below 45° C. in the course of 1 to 60 minutes and preferably in the course of 1 to 5 minutes. It is also important that the gelatin is converted to the gel phase within a short time. In the case of the process of preparation according to the invention, this conversion takes place in the course of 5 to 45 minutes and preferably in the course of 5 to 15 minutes.

Thus, whilst in accordance with the known processes the extraction is carried out over a period of more than 2 hours and at relatively low temperatures of below 70° C., if the gelatins according to the invention are to be obtained it is necessary to carry out the extraction at higher temperatures and within a very short time, ensuring good heat-transfer conditions. By using the electrophoresis method, which enables the composition of the particular gelatin to be determined, the process according to the invention can be carried out in such a way that gelatins which have high viscosities and, at the same time, a low peptide content are obtained at specific times and in specific withdrawal sequences.

A further process for the preparation of the gelatins according to the invention is the fractionation of commercially available gelatins, in which case the composition is checked with the aid of gel chromatography.

The gelatins according to the invention not only have a particularly advantageous setting time but, at the same time, because of their high viscosity, are particularly suitable for use in certain modern coating techniques, for example curtain coating, because it is not necessary to add to them any substances to increase the viscosity, for example sodium cellulose sulfate for, e.g. the production of photographic layers. In some applications these additives impair the other characteristics of the gelatin product (discolouration).

A further decisive advantage of the gelatins according to the invention is that in industrial processes the gelatin drying process can be shortened. Whilst retaining a conventional drying length of a machine, it is possible for example, to raise the temperatures of the drying air, since the melting point of the gelatin according to the invention is 1° to 3° C. higher than that of conventional types of gelatin. In other industrial processes, blowing with cooling air can be dispensed with or reduced.

Photographic materials as a rule consist of a flat substrate, to which at least one, but usually several, thin layers have been applied. At least one of these layers is sensitive to light and, in the case of conventional photographic material, consists of a fine dispersion of silver halide in a hydrophilic, colloidal binder. The light-sensitive layers and, if desired, further layers which are not sensitive to light, can also contain a number of further substances, for example dyes, colour couplers, sensitisers, stabilisers, solvents, wetting agents or hardeners, and also additional, non-hydrophilic binders in the dispersed form.

Since the invention of the dry plate, gelatin has been the preferred hydrophilic binder for photographic layers and, despite the advances in the production of polymeric substances, is still virtually irreplaceable today. The reason for this is that gelatin has unique properties which are not combined in such an advantageous manner in any other naturally occurring or synthetic substance:

the chemical properties of gelatin and of the substances which naturally accompany it; these properties enable silver halide layers with particularly high sensitivity to light to be prepared;

the swellability and permeability for aqueous processing solutions;

the advantageous characteristics as a protective colloid, which permit the preparation and stabilisation of finely dispersed emulsions and dispersions, especially of silver halides, and the physical properties of gelatin solutions, which favour the application and the drying of thin, uniform layers.

A characteristic of the technology of the production of photographic materials is that gelatin with very different properties must be available. This applies in particular to the chemical properties of the gelatins, on which the sensitometry of the light-sensitive layers is highly dependent. The gelatin industry has proved able to meet the changing demands of photographic technology to an ever greater extent and in particular also to satisfy the demands made with regard to the reproducibility of the materials.

In addition to the chemical properties, the physical properties of the gelatin used also play a decisive role in the production of photographic materials, especially in the precise and streamlined production of thin photographic layers. Two properties are particulary important here: the viscosity of the aqueous solutions and the speed at which these solutions solidify.

As is known, aqueous gelatin solutions are liquid only at relatively high temperatures. Below about 30° C., they solidify to an elastic gel within a relatively short or long time. Only very dilute solutions with a concentration of less than about 1% are an exception to this; these solutions remain liquid at all temperatures. The ability to gel to an elastic gel is an important characteristic which greatly facilitates, if it is not entirely responsible for enabling, the production and drying of precise, thin layers.

The photographic layers are always applied to the substrate in the liquid state, and frequently even several liquid layers are applied at the same time. The layers must then be dried. This is most rapidly and most advantageously effected by blowing warm air onto the surface of the layer. Since it is not possible to roll up a material in which the layers have not dried, the application of the layer and drying must always be carried out continuously in one pass. For the drying operation, it is essential that the layers coated with high precision are not deformed either by force of gravity or by the moving warm air. In the case of gelatin-containing layers, this requirement can be met in a particularly simple manner by allowing the layers to setting to a gel as rapidly as possible, by passing the coated base through a cooling channel, prior to the start of the drying operation. The more rapidly the setting of the layer takes place, the less is the technical effort required for the cooling section and the higher is the throughput speed which can be chosen. A general description of the coating and drying technology for photographic materials is given, for example, in B. M. Deryagin et al. "Film Coating Theory", Focal Press 1964.

The speed at which gelatin solutions set is in general dependent on the concentration and the temperature. It can be improved by increasing the gelatin concentration in the coating solution. However, the coating technology places certain limits on such a procedure, which limits may not be exceeded. Furthermore, in terms of colloid chemistry, coating solutions which are too concentrated are frequently instable and can tend, for example, to demixing or to coagulation of individual components.

With the gelatins according to the invention, these disadvantages in the production of photographic layers (materials) can be substantially overcome. The present invention thus also relates to the use of the gelatins according to the invention as binders for the production of photographic layers (materials) and to a process for the production of photographic materials consisting of a base and at least one photographic layer, which comprises using a gelatin according to the invention as the binder for at least one layer. The invention also relates to the photographic materials obtained in this way. These materials, and the layers of the material, are distinguished by good mechanical properties. The good compatability of the gelatins according to the invention with photographic additives (for example dyes or colour couplers) and the optimum characteristics during photographic processing (after exposure of the photographic material) have an extremely advantageous effect on the colour reproduction.

The gelatins according to the invention are of particular advantage in the pharmaceutical and foodstuffs industries, as well as in the photographic industry. In the pharmaceutical industry, medical preparations are frequently packed in hard gelatin capsules. These hard capsules are produced in a dip process, with which particularly uniform capsules are obtained in a reproducible manner when the setting time of the gelatin used is very short.

This production of hard capsules by the dip process is a further important field of application for the rapid-setting gelatins according to the invention, and because of the high viscosity of these gelatins, the flow characteristics can also be utilised in an advantageous manner.

The above applies correspondingly in the case of gelatin for foodstuffs, for which short setting times can likewise be extremely desirable. For example, in the confectionery industry, in the production of marshmallows the strips produced from the beaten mixture must be so far set after about 30 seconds that they can be cut. During this time, the strip produced from the beaten mixture passes along 20 to 30 m long cooling belts. In this case, shortening of the setting time means that it is possible to cut earlier and that a substantial saving can be made in the size of installation. In the production of jelly sweets also, a shortening of the setting time results in an acceleration of the production process and in a saving of, for example, powder boxes and storage space. Similarly, in the preserved fish and meats industries, a reduction in the setting time of the gelatin results in increased output and in a reduction in the size of installation, since, for example, shorter cooling tunnels can be employed. For domestic purposes also, a gelatin with a short solidification time is advantageous, since, for example, when preparing "jellies" or "brawn" it is no longer necessary to place the containers filled with gelatin solution in the refrigerator for several hours. Furthermore, the fact that commercially available gelatins solidify too slowly has to date been an insurmountable obstacle to the use of gelatin for the preparation of flan fillings. Because solidification takes place too slowly, the gelatin solution which is still liquid penetrates into the base of the flan and softens it. For this reason only gelling agents which solidify rapidly, such as pectin, agar-agar, carrageenan and alginates, are used for flan fillings. A shortening of the solidification time means that gelatin can be used for this purpose also, and replacement of the abovementioned gelling agents by gelatin is particularly advantageous because those gelling agents which, because of their short solidification time, are frequently employed not only in the confectionery trade but also in other branches of the foodstuffs industry have disadvantages from the point of view of taste and texture.

EXAMPLE 1

The fat is extracted under mild conditions, by fat extraction with water, from crushed bones obtained from raw bones from freshly slaughtered animals, and the crushed bones are macerated under mild conditions in a conventional manner. The macerated material is then lyed in alkaline medium and neutralised in the conventional manner. A first decoction is extracted at a boiling pH value of 6.5 and a temperature of 72° C. in the course of 35 minutes and a second extract is achieved at the same pH value and at 78° C. in the course of a further 20 minutes. The third extract, corresponding to 50 to 65% of the total yield, is then extracted at a boiling pH of 6.5 and at 80° C. in the course of 25 minutes in a conventional stirred kettle. A partially continuous extraction process leads to the same results. The gelatin solution obtained is cooled to 50° C. in the course of 3 to 5 minutes and transformed to the gel phase in the course of about 10 minutes. The gelatin obtained in the third extract has the characteristics given under sample number 4 in Table 2.

The second extract (Table 2, sample number 3) and the fourth extract (Table 2, sample number 1) (extraction pH value 6.7, at 84° C. and for 20 minutes) can also give usable, highly viscous gelatins with a low peptide content in the sense of the invention. In general, the middle extracts correspond to about 45 to 75% of the total yield.

EXAMPLE 2

Thick hide split is cut in the conventional manner, washed and lyed with aqueous calcium hydroxide or sodium hydroxide solution under the customary conditions. The subsequent procedure is as described in Example 1. Highly viscous gelatins of low peptide content are obtained, and even in the first extracts the amounts obtained correspond to 0 to 20% of the total yield. The values for the boiling pH, the boiling temperature and the boiling time are: 7.0, 90° C. and 15 minutes. As in Example 1, the resulting gelatin solutions are cooled to 50° C. in the course of 3 to 5 minutes and transformed to the gel phase in the course of about 10 minutes. The data for a gelatin obtained in this way are given in Table 2 under sample number 2.

EXAMPLE 3

Fresh or frozen pig skins are washed and treated with acid in the customary manner. The subsequent procedure is then as indicated in Example 1, under corresponding conditions, the extraction pH value being, however, 5.0. The extraction temperature is 72° C. and the extraction time 15 minutes. The characteristic data for the resulting gelatin are given in Table 2 under sample number 5.

TABLE 2

| Sample number | 1 | 2 | 3 | 4 | 5 |
|---|---|---|---|---|---|
| Proportion of fragments of α-gelatin (%) | 14 | 13 | 7 | 7 | 21 |
| Intrinsic viscosity [dl $g^{-1}$] (at 45° C. $A_2$ = O) | 0.85 | 0.95 | 0.8 | 1.0 | 0.85 |
| Gel strength [dyn. $cm^{-2}$] (at 16° C., 2.5 g of gelatin in 1 dl) | $9 \times 10^4$ | $9 \times 10^4$ | $9 \times 10^4$ | $9 \times 10^4$ | $9 \times 10^4$ |
| Setting time [seconds] (at 16° C., 2.5 g of gelatin in 1 dl) | 48 | 42 | 54 | 27 | 49 |

For the definition of the parameters: intrinsic viscosity, gel strength and setting time see A. Veis "The Macromolecular Chemistry of Gelatin" 1964, Academic Press and J. Brandrup, E. M. Immergut "Polymer Handbook" 1978, Interscience.

EXAMPLE 4

Table 3 which follows illustrates the significance of the gelatin composition of the gelatins according to the invention and of the amounts of the various fractions, in particular peptide fragments and microgel, contained therein. The gelatin samples designated by the numbers 6 to 10 are prepared by fractionation of commercially available gelatins. The composition of the fractions is determined by preparative gel chromatography.

TABLE 3

| Sample number | 6 | 7 | 8 | 9 | 10 |
|---|---|---|---|---|---|
| α-gelatin % | 44 | 58 | 46 | 26 | 10 |
| peptides % (α-fragments) | 18 | 10 | 14 | 1 | 1 |
| oligomers of α-gelatin % | 30 | 30 | 30 | 70 | 9 |
| microgel % (high polymers) | 8 | 2 | 10 | 3 | 80 |

TABLE 3-continued

| Sample number | 6 | 7 | 8 | 9 | 10 |
|---|---|---|---|---|---|
| setting time seconds (2.50% solution, 16° C.,) | 70 | 50 | 50 | 8 | 2 |
| gel strength dyn.cm$^{-2}$ (2.50% solution, 16° C.) | $6.7 \times 10^4$-$1 \times 10^5$ | $8.1 \times 10^4$-$9 \times 10^4$ | $7.4 \times 10^4$-$1 \times 10^5$ | $10^5$ | $10^5$ |
| viscosity mP (6.67% solution, 60° C.) | 75 | 46 | 91 | 77 | $3 \times 10^4$ |
| aminoacids in the D-configuration % | 4.5 | 4.5 | 4.0 | 4.0 | 4.0 |

Measurement of the viscosities of 6.67% solutions of gelatins 6 to 10 at 40° C. gives the values: 13, 8, 14, 9 and 40 cP.

From Table 3 it can be seen that there is a direct relationship between the solidification time and the peptide content of the gelatin. On the other hand, the gel strength and the viscosity of the gelatin solutions are, within the range covered by Table 3, largely independent of the peptide content.

On the other hand, it can clearly be seen that a good correlation exists between the microgel content and the viscosity of the solutions.

For comparison, Table 4 gives the corresponding values for five different commercially available gelatins.

TABLE 4

| Sample No. | 11 | 12 | 13 | 14 | 15 |
|---|---|---|---|---|---|
| Raw material | Bones | Skin | Bones | Bones | Skin |
| Digestion method | HCl | HCl | $Ca(OH)_2$ | $Ca(OH)_2$ | NaOH |
| peptides % (α-fragments) | 60 | 30 | 30 | 40 | 30 |
| microgel % (high polymers) | 3 | 2 | 2 | 15 | 3 |
| setting time seconds (2.50% solution, 16° C.) | 400 | 200 | 120 | 90 | 150 |
| gel strength dyn.cm$^{-2}$(2.50% solution, 16° C.) | $5 \times 10^4$ | $7.5 \times 10^4$ | $6 \times 10^4$ | $5.5 \times 10^4$ | $6.5 \times 10^4$ |
| viscosity cP (6.67% solution, 40° C.) | 6 | 5 | 5 | 18 | 6 |

As in the case of the gelatins according to the invention, shown in Table 3, the relationship between the solidification time and the peptide content on the one hand and the relationship between the viscosity and the microgel content on the other hand are discernible in this case also. Since, however, the commercially available gelatins 11 to 15 all have relatively high peptide contents, the short solidification times of gelatins 6 to 10

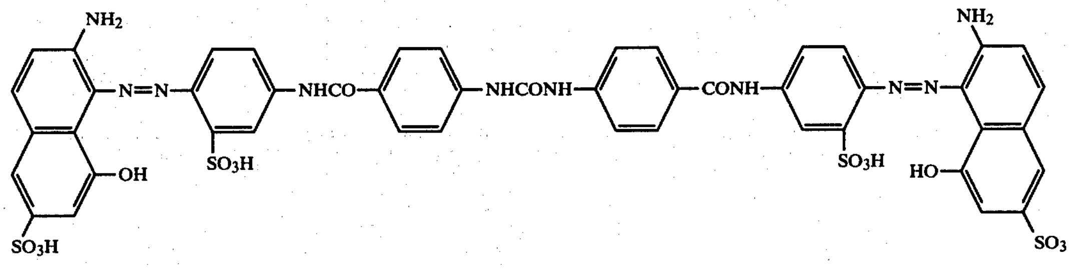

(102)

according to the invention are not achieved with any of these commercial gelatins.

EXAMPLE 5

Using a gelatin prepared according to Example 1 (gelatin sample number 4 from Table 2), a silver halide emulsion containing a chromogenic coupler is prepared, and processed to give a photographic layer, as follows:

150 g of a red-sensitised silver halide emulsion, containing 24.37 g of silver bromide and 7 g of gelatin, are mixed with 300 g of a finely dispersed emulsion containing 20 g of the two-equivalent cyan coupler of the formula

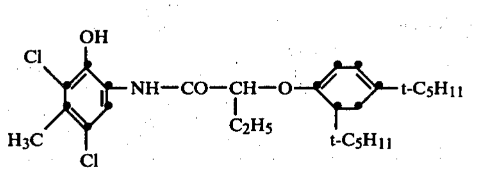

(101)

10 g of trikresyl phosphate, 2.5 g of an anionic dispersant and 15 g of gelatin. 550 g of a 7% aqueous gelatin solution are also added to the mixture.

This yields 1,000 g of a solution which is ready for coating and contains 1.4% of silver, 2% of coupler and 6.05% of gelatin. The viscosity at 40° C. is 16 cP and the setting time, measured at 16° C., is 20 seconds. Exactly the same setting time is measured when a solution is used which contains only 6.05% of the same gelatin No. 4 and no further additives.

The ready-for-coating solution is applied in a coating thickness corresponding to a weight per unit area of 20 g per m$^2$ onto a glass support, gelled by cooling briefly and finally dried by blowing with warm air. A light-sensitive layer is obtained which after exposure under a transparent original and after conventional processing by colour developing, silver bleaching and fixing gives a negative cyan image of the original.

EXAMPLE 6

A coating solution is prepared from 5.2 g of the gelatin according to the invention which has sample number 16 (cf. Table 5), 1.5 g of the magenta dye of the formula and 93.3 g of water. (Coating solution No. 1).

In order to emphasize the improved setting characteristics of the gelatin according to the invention, identical solutions are prepared except that conventional gelatins (Nos. 17 and 18, Table 5) are used (coating solutions Nos. 2 and 3). The setting times are given in Table 6. Short setting times are of advantage in photographic technology.

TABLE 5

| Sample number | 16 | 17 | 18 |
|---|---|---|---|
| peptides % (α-fragments) | 19.0 | 45.0 | 43.8 |
| α-gelatin % | 16.2 | 24.5 | 24.5 |
| oligomers of α-gelatin % | 54.1 | 15.5 | 30.7 |
| microgel % (high polymers) | 9.7 | 15.0 | 1.0 |
| viscosity mP (6.67%, 60° C.) | 105 | 108 | 40.3 |

TABLE 6

| Solidification temperature °C. | Cooling time seconds | Solidification time (seconds) Coating solution No. (gelatin No.) 1 (16) | 2 (17) | 3 (18) |
|---|---|---|---|---|
| 5 | 8 | 16 | 17 | 23 |
| 10 | 8 | 21 | 63 | 37 |
| 15 | 8 | 65 | 195 | — |

The cooling time is the time within which the temperature in the measurement apparatus is adjusted to the setting temperature at which the setting time of the gelatins is determined.

In all cases, the setting time measured is a function of the setting temperature and is longer the higher the setting temperature chosen. As can be seen from the Table, gelatin 16 according to the invention has more advantageous characteristics than the comparison gelatins 17 and 18 in every case; however, the effect is more pronounced at the higher setting temperature.

EXAMPLE 7

With this example it can be shown that the properties of the gelatins according to the invention from the sensitometric point of view are equal to those of commercially available control gelatins. For this purpose, a silver halide emulsion suitable for graphic materials is prepared by precipitating the silver halide on the one hand in a solution of gelatin No. 16 according to the invention and, for comparison, in a solution of the commercially available gelatin No. 18 and then further processing the two samples by physical and chemical ripening in the conventional manner to give ready-for-use emulsions.

The characteristic and photographically relevant parameters for the two emulsions are given in Table 7 below.

TABLE 7

| Characteristics of the emulsion | (Gelatin No. 16) | | | (Gelatin No. 18) | | |
|---|---|---|---|---|---|---|
| Crystal habitus | cubic | | | cubic | | |
| Composition | 30 mol % of AgBr 70 mol % of AgCl | | | 30 mol % of AgBr 70 mol % of AgCl | | |
| Particle size at (50% by volume) | 0.23μ | | | 0.29μ | | |
| Chemical ripening | thiosulfate | | | thiosulfate | | |
| Time taken for chemical ripening in minutes | 60 | 80 | 100 | 60 | 80 | 100 |
| Exposure (seconds), 5.5 Lux | 20 | | | 20 | | |
| Developing | 3 minutes at 20° C. | | | | | |
| Δlog $E_{0.5}$ (logarithmic sensitivity) | 0.16 | 0.18 | 0.11 | 0.29 | 0.18 | 0 |

The above table shows that, apart from slight differences which are due to the fact that the two gelatins are not of precisely identical origin, the photographic properties, and in particular the relative sensitivity of the two emulsions, lead to very similar values under identical precipitation and ripening conditions. However, as has been shown in the preceding Example 6, the emulsion according to the invention possesses considerably more advantageous physical properties.

EXAMPLE 8

In this example a comparison of the fog/sensitivity relationship for twinned octahedral emulsions is carried out as a further test of the usefulness of the gelatins according to the invention in photography. Silver halide emulsions 3 and 4 are prepared using gelatins 16 and 18. The sensitometric properties of the emulsions are determined after sulfur sensitising and sulfur/gold sensitising and also with high-intensity (flash) and low-intensity exposure. The results are calculated for a particle size of 0.75μ. The choice of the gelatin for the highly sensitive emulsion of this example presents particular problems with regard to obtaining good sensitivity/fog relationships. The results which are achieved after developing for 3 minutes at 20° C. are given in Table 8.

TABLE 8

| Characteristics of the emulsion | | | | | | | | | | |
|---|---|---|---|---|---|---|---|---|---|---|
| Designation of the emulsion | 3 | | | | | 4 | | | | |
| Gelatin used, No. | 16 | | | | | 18 (control) | | | | |
| Composition in mol % | 2.5 AgI 97.5 AgBr | | | | | 2.5 AgI 97.5 AgBr | | | | |
| Particle size (50% by volume) | 0.75μ | | | | | 0.82μ | | | | |
| $\frac{D_{min}}{D_{max}}$ | 0 | 0.05 | 0.1 | 0.2 | 0.3 | 0 | 0.05 | 0.1 | 0.2 | 0.3 |
| Δlog $E_{0.5}$ (relative) with sulfur ripening Exposure 20 seconds; 5.5 Lux | 0.42 | 1.15 | 1.26 | 1.30 | 1.31 | 0.55 | 1.30 | 1.33 | 1.35 | 1.35 |
| with sulfur/gold ripening. Exposure 20 seconds; 5.5 Lux | 1.85 | 2.20 | 2.26 | 2.22 | 2.20 | 1.70 | 1.90 | 2.05 | 2.20 | 2.28 |
| with sulfur ripening flash exposure $10^{-6}$ seconds; | | | | | | | | | | |

TABLE 8-continued

| Characteristics of the emulsion | | | | | | | | | | |
|---|---|---|---|---|---|---|---|---|---|---|
| 1μ Joule/cm² | 1.05 | 1.88 | 1.92 | 1.95 | 1.96 | 0.85 | 1.92 | 2.00 | 2.05 | 2.05 |

The table shows that in this case also it is possible using gelatin No. 16 according to the invention under identical conditions of preparation to prepare photographic emulsions which, in respect of their sensitometric characteristics (sensitivity and ratio of maximum density and fog), are nearly identical with those emulsions which are prepared from a commercially available gelatin.

At the same time, however, the emulsion according to the invention which is prepared from gelatin No. 16 is of greater value for use in the preparation of photographic materials, because of its shorter setting time.

What is claimed is:

1. A photographic material which contains, on a base, in at least one layer, as a binder, gelatin which contains microgel, oligomers of α-gelatin, α-gelatin and fragments of α-gelatin (peptides), wherein the gelatin contains less than 25 percent by weight of fragments of α-gelatin (peptides) with a molecular weight of not more than $9\times10^4$.

2. A photographic material according to claim 1, wherein the peptide content of the gelatin is less than 20 percent by weight.

3. A photographic material according to claim 2, wherein the peptide content of the gelatin is less than 10 percent by weight.

4. A photographic material according to claim 1, wherein the content of microgel in the gelatin is between 2 and 20 percent by weight, the content of oligomers of α-gelatin (n=2 to 15) is between 30 and 70 percent by weight and the content of α-gelatin is between 20 and 60 percent by weight.

5. A photographic material according to claim 4, wherein the content of microgel in the gelatin is between 5 and 15 percent by weight, the content of oligomers of α-gelatin (n=2 to 15) is between 30 and 70 percent by weight and the content of α-gelatin is between 20 and 60 percent by weight.

6. A photographic material according to claim 1, wherein the gelatin contains less than 5 percent by weight of aminoacid radicals in the D-configuration.

7. A photographic material according to claim 1, wherein the gelatin has a viscosity of 25 to 125 mP (6.67% aqueous gelatin solution, 60° C.).

8. A photographic material according to claim 7, wherein the gelatin has a viscosity of 45 to 105 mP (6.67% aqueous gelatin solution, 60° C.).

9. A photographic material according to claim 1, wherein the layer is a silver halide emulsion layer or an auxiliary layer.

10. In a process for the production of photographic materials the improvement which comprises coating on a support at least one layer containing a gelatin which contains microgel, oligomers of α-gelatin, α-gelatin and fragments of α-gelatin (peptides), wherein the gelatin contains less than 25 percent by weight of fragments of α-gelatin (peptides) with a molecular weight of not more than $9\times10^4$ prepared by extracting or melting out a new material which has been subjected to an alkaline pre-treatment with an aqueous calcium hydroxide or sodium hydroxide solution at a temperature of from 70° to 100° C. for 5 to 120 minutes at a pH-value of from 5.5 to 7.

* * * * *